(12) United States Patent
Gitt

(10) Patent No.: US 7,437,964 B2
(45) Date of Patent: Oct. 21, 2008

(54) DOUBLE CLUTCH TRANSMISSION

(75) Inventor: Carsten Gitt, Stuttgart (DE)

(73) Assignee: Daimler AG, Stuttgart (DE)

( * ) Notice: Subject to any disclaimer, the term of this patent is extended or adjusted under 35 U.S.C. 154(b) by 180 days.

(21) Appl. No.: 11/331,831

(22) Filed: Jan. 14, 2006

(65) Prior Publication Data

US 2006/0150759 A1    Jul. 13, 2006

Related U.S. Application Data

(63) Continuation-in-part of application No. PCT/EP2004/007773, filed on Jul. 14, 2004.

(30) Foreign Application Priority Data

Jul. 16, 2003    (DE)    ............................... 103 32 210

(51) Int. Cl.
*F16H 3/08* (2006.01)

(52) U.S. Cl. .......................... 74/330; 74/331

(58) Field of Classification Search .................. 74/330, 74/331, 333
See application file for complete search history.

(56) References Cited

U.S. PATENT DOCUMENTS

| | | | |
|---|---|---|---|
| 5,921,137 A | 7/1999 | Buri et al. | |
| 6,021,684 A | 2/2000 | Alfredsson | |
| 7,021,169 B2* | 4/2006 | Kobayashi | 74/333 |
| 7,044,013 B2* | 5/2006 | Ahrens | 74/331 |

FOREIGN PATENT DOCUMENTS

| | | |
|---|---|---|
| DE | 28 41 053 | 4/1980 |
| DE | 39 07 154 | 9/1989 |
| DE | 40 00 042 | 7/1990 |
| DE | 24 41 053 | 4/1992 |
| DE | 41 23 493 | 1/1993 |
| DE | 44 22 900 | 11/1994 |
| DE | 198 21 164 | 11/1999 |
| DE | 198 29 925 | 1/2000 |
| DE | 199 56 971 | 5/2000 |
| EP | 0 987 467 | 3/2000 |
| WO | WO 01/65144 | 9/2001 |

* cited by examiner

*Primary Examiner*—Sherry Estremsky
(74) *Attorney, Agent, or Firm*—Klaus J. Bach

(57) ABSTRACT

In a double clutch transmission of a drive train of a vehicle with rear-axle drive or all-wheel drive and a front longitudinally mounted drive engine, wherein concentric central shafts of the double clutch transmission are supported by first and second rolling bearings in an X arrangement, third and fourth rolling bearings are provided by which the transmission output shaft is supported and the rolling bearings are preloaded and also disposed in an X arrangement in relation to the rolling bearings supporting the transmission output shaft.

9 Claims, 2 Drawing Sheets

Fig. 1

DOUBLE CLUTCH TRANSMISSION

This is a continuation-in-part application of international application PCT/EP2004/007773 filed Jul. 14, 2004 and claiming the priority of German application 10 32 210.8 filed Jul. 16, 2003.

BACKGROUND OF THE INVENTION

The invention relates to a double clutch transmission with an input shaft, a main shaft and an intermediate shaft, each connectable to the input shaft by one of the clutches.

A double clutch transmission, in which a transmission input shaft and a gear output shaft are arranged coaxially with one another, or with a central axis, is known, for example, from DE 41 23 493 A1. The two clutches of the double clutch are in each case connected in a rotationally fixed manner to an intermediate shaft. The output torque can be transmitted to the transmission output shaft from the two clutches in each case via a countershaft arranged parallel to the central axis. The transmission output shaft is supported firmly on the one hand in a transmission housing and on the other hand in relation to an intermediate shaft.

A double clutch transmission in which a transmission gear input shaft and a transmission gear output shaft are arranged coaxially with one another, or with a central axis, is also known from EP 0 987 467 A2. The two clutches of the double clutch are in each case connected in a rotationally fixed manner to an intermediate shaft. These two intermediate shafts carry the drive gears for all the different speeds with the exception of an output drive constant at the transmission gear output end. One intermediate shaft is in the form of a hollow shaft and mounted or supported radially at its transmission-internal end by means of a partition.

Furthermore, DE 198 21 164 A1 shows in FIG. 2 a bearing arrangement of a double clutch transmission for a front transverse drive train.

It is the principal object of the present invention to provide a double clutch transmission with a coaxial input shaft and an output shaft, which can transmit high torques in a cost-effective and compact arrangement.

SUMMARY OF THE INVENTION

In a double clutch transmission of a drive train of a vehicle with rear-axle drive or all-wheel drive and a front longitudinally mounted drive engine, wherein concentric central shafts of the double clutch transmission are supported by first and second rolling bearings in an X arrangement, third and fourth rolling bearings are provided by which the transmission output shaft is supported and the rolling bearings are preloaded and also disposed in an X arrangement in relation to the rolling bearings supporting the transmission output shaft.

The arrangement according to the invention is simple in its design of the bearing arrangement as a result of the X arrangement of the rolling bearings and is capable of transmitting high torques.

In a particularly advantageous embodiment, the rolling bearings are cost-effective tapered-roller bearings.

Preferably, each of the two intermediate shafts is assigned exactly one gear set. In this connection, the two gear sets via which the force flow of all the gears with the exception of the direct gear flows are referred to as the two constants. In a particularly advantageous way, the radially outer intermediate shaft—that is the hollow shaft—can be supported radially on a clutch bell partition. If the intermediate shafts are appropriately short, it is possible in a particularly advantageous way to dispense with an additional partition for the radial mounting or support of the projecting radially inner intermediate shaft. This results in corresponding advantages with respect to costs, mounting complexity and overall axial length of the transmission.

A third rolling bearing supports one intermediate shaft inside the other intermediate shaft in an X arrangement in relation to the rolling bearing which supports the transmission output shaft in the transmission housing may be provided.

A fourth rolling bearing, which supports one of the two intermediate shafts in relation to the clutch bell inner wall, can also be provided. In a particularly advantageous way, this fourth rolling bearing can be in an X arrangement in relation to the rolling bearing which supports the transmission output shaft in the transmission housing.

In a particularly advantageous embodiment, at least two of the four rolling bearings can be identical bearings, which has cost advantages in that the number of different items is reduced. Mounting advantages are also obtained as there is no risk of a mix-up with identical rolling bearings. In a particularly advantageous way, these rolling bearings are both tapered-roller bearings or angular ball bearings.

In a particularly advantageous embodiment of the invention:
the intermediate shaft in the form of a hollow shaft is mounted in relation to the transmission housing by means of a tapered-roller bearing,
the radially inner intermediate shaft is mounted in relation to the outer intermediate shaft which is in the form of a hollow shaft by means of a tapered-roller bearing,
the transmission output shaft is mounted in relation to the radially inner intermediate shaft by means of a tapered-roller bearing, and
an additional needle bearing or roller bearing is provided between the two coaxial intermediate shafts.

The use of a dry clutch has the advantage compared with a wet multiple-disk clutch that the efficiency is considerably higher. The use of a dry double clutch is particularly expedient in connection with commercial vehicles.

An arrangement wherein three rolling bearings are provided in an X arrangement in relation to a rolling bearing which supports the transmission output shaft at its rear end in the transmission housing is particularly advantageous. The three rolling bearings can then be arranged at least in, part within gears, so that an axially short construction is made possible by virtue of "nesting". This axially short construction makes a virtually direct support of the bearing. forces effective on the three rolling bearings on a clutch bell partition possible. An additional partition for supporting the bearing reaction forces in the double clutch gear set is consequently not necessary, which is associated with corresponding cost, weight and construction space savings. Said gear can belong in particular to the gear constants.

In an embodiment in which the inner intermediate shaft carries at its end remote from the double clutch a gear of a first gear set which is smaller than a gear of a second gear disposed at the end of the intermediate shaft, provides for an optimum arrangement of the three rolling bearings in terms of construction space, the diameter of the rolling bearings increasing from the gear output in the direction axially toward the double clutch. The driving gearwheel of a second gear set is then advantageously
fixed or fixable to a hollow shaft and
larger than a driving gearwheel of a first gear constant.

In this connection, the gear of the first gear set is fixed or fixable to an intermediate shaft arranged inside the hollow shaft. This arrangement of the diameters makes it possible to make the rolling bearing arranged inside the second gear set larger than the rolling bearing arranged inside the first gear set. A further rolling bearing can support the hollow shaft on a clutch bell partition, for example. The latter rolling bearing is accordingly larger than the two rolling bearings mentioned previously. The three rolling bearings referred to in this paragraph are consequently larger the more or the longer they are subjected to load. That is to say the bearing dimensioning of these three rolling bearings corresponds to the level or the duration of the bearing loading.

Application of the invention in a drive train with a front longitudinally-mounted drive engine and transmission is particularly advantageous. The vehicle can then have a rear wheel drive or a multi-axle drive. In principle, also an output drive via the front axle alone is also possible.

The invention will become more readily apparent from the following description of an illustrative embodiment thereof with reference to the accompanying drawings.

DESCRIPTION OF A PARTICULAR EMBODIMENT

Figure 1:
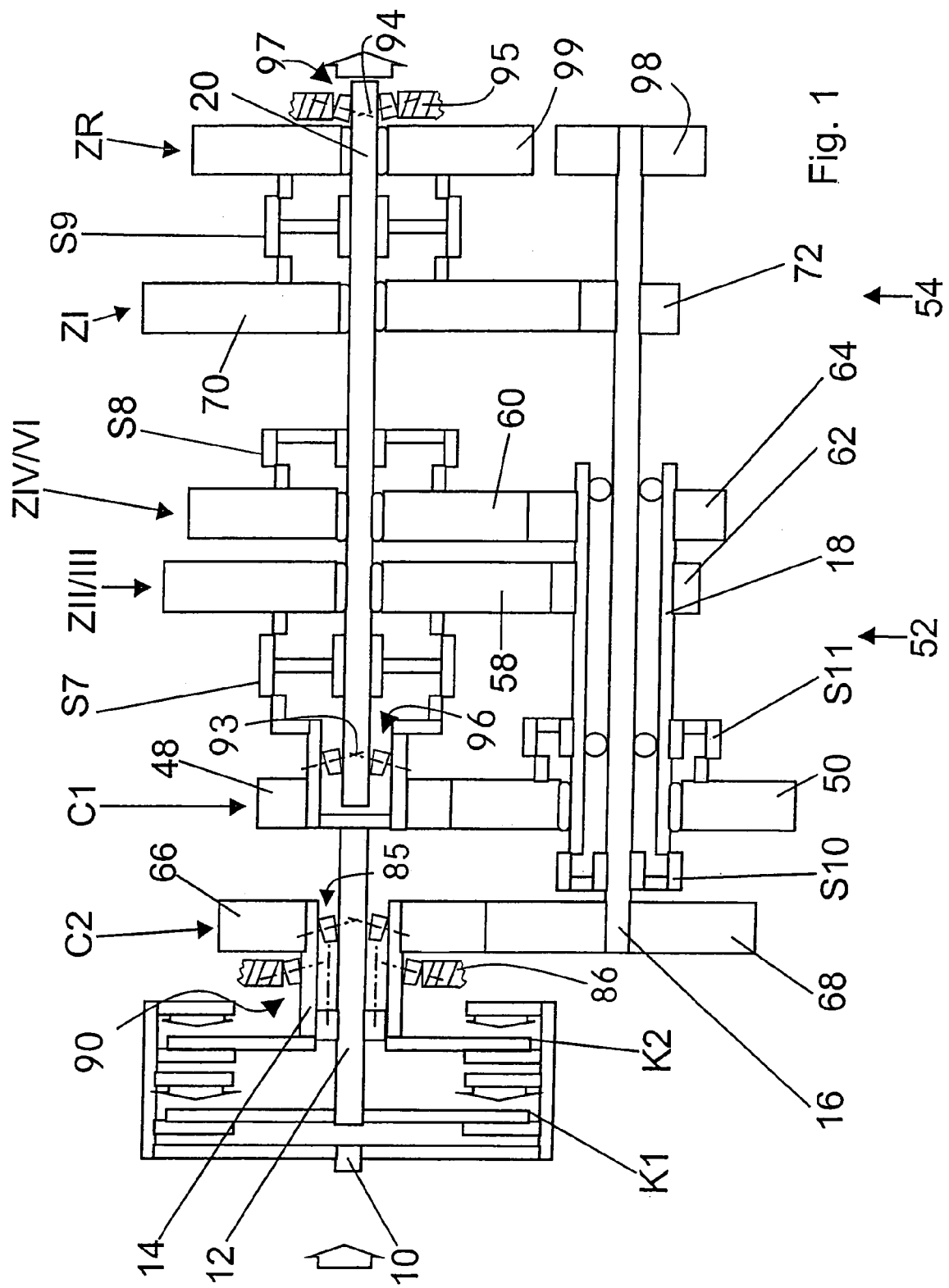
FIG. 1 shows a double clutch transmission with coaxial countershafts, in which the central shafts are rolling bearing-mounted in an X arrangement.

Below, the direction pointing from the vehicle rear or from the transmission output toward the drive engine or toward the double clutch is designated as the "front" direction. This corresponds to the direction "left" in the drawing plane. The correspondingly opposite direction is designated below as pointing to the "rear".

FIG. 1 shows a first illustrative embodiment of a double clutch transmission according to the invention, which finds application in a rear drive or multi-axle drive of a motor vehicle, the drive engine and double clutch gear of which are mounted longitudinally in the direction of travel. This vehicle may be in particular a high-torque passenger car or a utility vehicle.

In the double clutch transmission, an input-shaft 10 is connected to a transmission output shaft 20 by a first gear set 52 and a second gear set 54. The two gear sets 52 and 54 are arranged parallel to one another in the force flow. The gear sets 52, 54 each have a frictionally engaged change-under-load clutch K1, K2 and an intermediate shaft 12, 14, one intermediate shaft 14 of which is a radially outer hole low shaft and the other intermediate shaft 12 of which is a radially inner intermediate shaft. The intermediate shafts 12, 14 are arranged
concentrically with one another,
coaxially with the input shaft 10 and
coaxially with the transmission output shaft 20.

and can in each case be connected operationally to the input shaft 10 via the change-under-load clutch K1, K2.

The first intermediate shaft 12 of the first gear set 52 can be connected on the one hand to the gear output shaft 20 by an engageable and disengageable gearwheel clutch S7 for forming a direct fifth gear V and on the other hand to a countershaft 18, in the form of a hollow shaft extending parallel to the transmission output shaft 20, by the gearwheel clutch S11 via a first gear constant C1.

The countershaft 18 of the first gear set 52 is connected to the transmission output shaft 20 by a gear set ZIV/VI for forming the highest and the second highest gear IV, V.

The second, intermediate shaft 14, which is a hollow shaft, of the second gear set 52 is connected to the countershaft 16, which extends through the countershaft 18 of the first gear set 52 with a clearance, via a second gear constant C2. The second gear constant C2 has a fixed wheel 68 connected concentrically and in a rotationally fixed manner to the countershaft 16. The countershaft 16 belonging to the second gear set 54 is connected to the transmission out put shaft 20 via a gear pair ZR for two reverse speeds (via gear sets C1 or C2). One reverse speed may be for winter operation and the other for summer operation.

The gear set pair ZR for the reverse gears has a loose, wheel 99 which is arranged concentrically and rotatably on the transmission output shaft 20 and can be coupled to the transmission output shaft 20 by an engageable and disengage able gearwheel clutch S9, and a fixed wheel 98 which is connected concentrically and in a rotationally fixed manner to the countershaft 16. A gearwheel (not illustrated further) for reversing the direction of rotation is arranged between the loose wheel 99 and the fixed wheel 98 of the gearwheel set ZR.

A gearwheel clutch S10 is arranged on the end of the second countershaft 18 adjacent the change-under-load clutches K1, K2. The intermediate shaft 12 can advantageously be connected operationally to the countershaft 16 by this engageable and disengageable gearwheel clutch S10 via the first gear constant C1 and to the transmission output shaft 20 via the gearwheel pairs assigned to the second gear set 54. With each gear constant, output drive power can be transmitted to the transmission output shaft 20 via each, gear pair. The gear constants C1, C2 are different, so that each gearwheel pair is assigned to two gears.

Six different forward gears I, II, III, IV, V, VI, can be achieved with the two gear constants C1, C2. Corresponding to the sequential shifting-up from first to sixth gear I-VI, it is possible to shift down under load sequentially from sixth to first gear VI-I.

The countershaft 18 of the first gear structure 52 is connected to the transmission output shaft 20 by a gearwheel pair ZI/III and a gearwheel pair ZIV/VI. The gearwheel pairs ZII/III, ZIV/VI have in each case a loose wheel 58, 60 mounted concentrically and rotatably on the transmission output shaft 20. The gearwheels 58, 60 mesh with the fixed gearwheels 62, 64 arranged on the hollow countershaft 18. The loose gearwheel 58 and the loose gearwheel 60 can be coupled to the transmission output shaft 20 by the gearwheel clutch S7 and by a gearwheel clutch S8 respectively.

The countershaft 16 belonging to the second gear structure 54 is connected to the transmission output shaft 20 via the gearwheel pair ZI and via a gearwheel pair ZR.

The gearwheel pair ZI for the first gear I has a loose wheel 70, which is arranged concentrically and rotatably on the transmission output shaft 20 and can be coupled to the transmission output shaft 20 via a gearwheel clutch S9, and a fixed wheel 72 arranged concentrically and in a rotationally fixed manner on the countershaft 16.

The intermediate shaft 14 of the second gear structure 54 can be connected operationally to the countershaft 18 of the first gear structure 52 by an engageable and disengageable gearwheel clutch S10 via the second gear constant C2 and to the transmission output shaft 20 via the gearwheel pairs ZII/III, ZIV/VI assigned to the first gear structure 52. The intermediate shaft 12 can advantageously be connected operationally to the countershaft 16 by the engageable and disengageable gearwheel clutch S10 via the first gear constant C1 and to the transmission output shaft 20 via the gearwheel pairs ZI, ZR assigned to the second gear structure 54. With each gear constant C1 and C2, an output torque can be transmitted to the transmission output shaft 20 via each gearwheel pair ZI, ZIV/VI, ZII/III and ZR. The gear constants C1 and C2 are different, so that the gearwheel pairs ZII/III, ZIV/VI are in each case assigned to two gears II, III and IV, VI. Only the first gear I is assigned to the gearwheel pair ZI, by virtue of which it can advantageously be selected independently of another gear and can be matched specifically to a given area of application of the double clutch gear.

Figure 2:
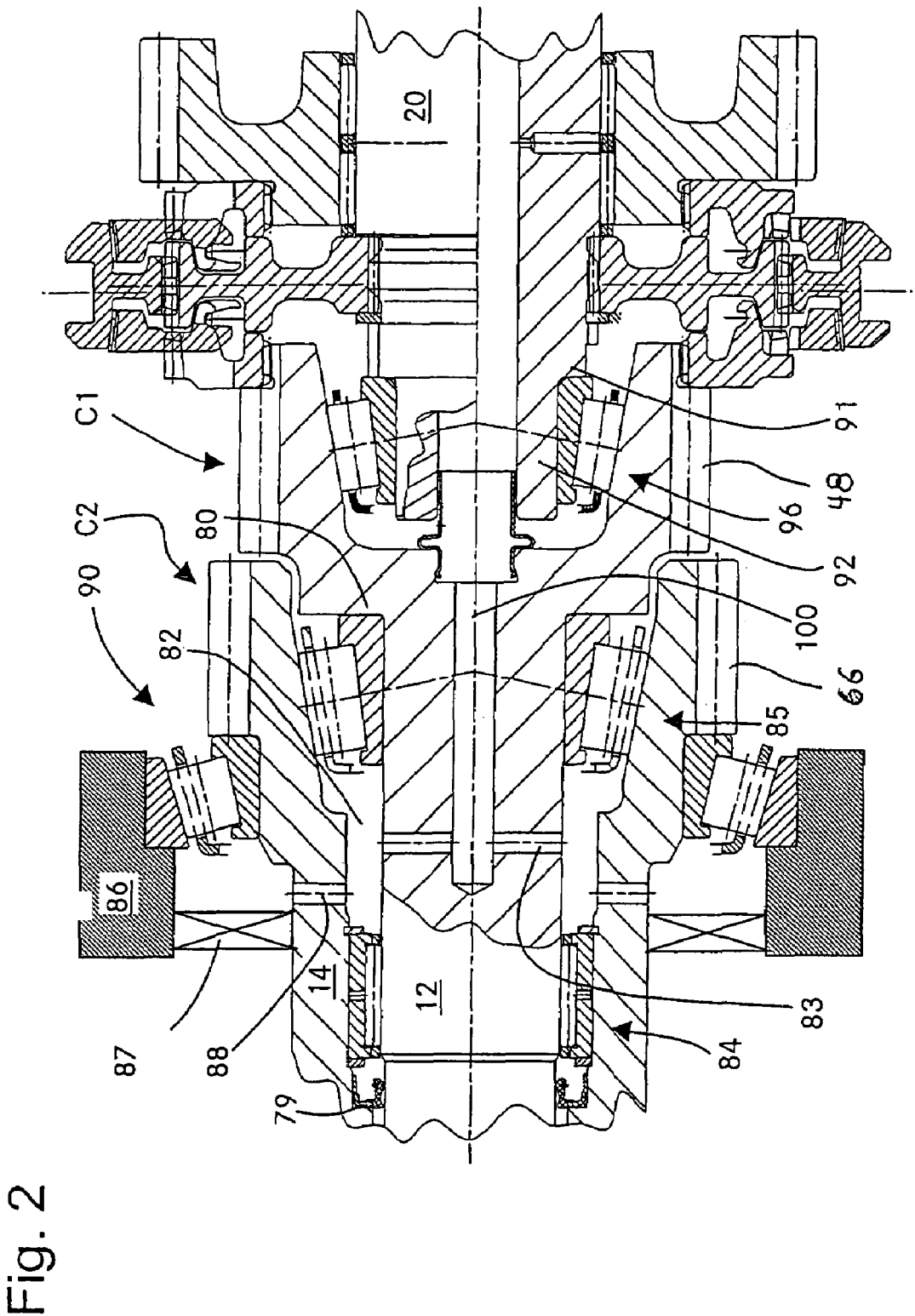
FIG. 2 shows a detail of the rolling-bearing arrangement of FIG. 1.

The transmission output shaft 20 is at its two ends mounted in an X arrangement by means of slightly preloaded taperedroller bearings 96, 97. For this, the rear end, of the transmission output shaft 20 is received rotatably in a transmission housing 95 by means of the rear tapered-roller bearing 97. The supporting cone 94 of this rear, first tapered-roller bearing 97 points toward the two clutches K1, K2. On the other hand, the supporting cone 93 of the front, second taperedroller bearing 96 points away from the two clutches K1, K2, this second tapered-roller bearing 96 inter alia being more clearly visible in the detailed FIG. 2.

The front, second tapered-roller bearing 96 comprises next to the tapered rollers a bearing inner ring which is disposed on a front journal 92 of the gear output shaft 20 and is supported axially on a shoulder 91 in the direction toward the rear. The tapered rollers roll, radially on the outside, on an inner conical surface of a fixed wheel of the first gear constant C1. The fixed wheel of the gear constant, C1 thus has the form of a potshaped internally conical gear ring, the pot edge of which lies at the rear end and the pot bottom of which lies at the front end and extends radially inward and merges with the intermediate shaft 12 via a shoulder 80. A bearing inner ring of a third tapered-roller bearing 85, which ring is supported on said shoulder 80, is mounted on a machined surface of the intermediate shaft 12. This third tapered-roller bearing 85 likewise has an X arrangement in relation to the first tapered-roller bearing 97 arranged at the gear output. That is to say the supporting cone points toward the rear. The tapered rollers of this third tapered-roller bearing 85 roll, radially on the outside, on an inner conical surface of the fixed wheel of the second gear constant C2. The fixed wheel of the second gear constant C2 thus likewise has the form of a pot-shaped internally conical gear ring, the pot edge of which lies at the rear end and the pot bottom of which lies at the front end. However, this pot bottom merges with the intermediate hollow shaft 14.

A fourth tapered-roller bearing 90, which like the second and the third-tapered-roller bearing is in an X arrangement in relation to the first tapered-roller bearing 97, is arranged on a bearing region in front of the fixed wheel of the second gear constant C2. The bearing inner ring of this fourth taperedroller bearing 90 is supported axially on the gear ring of the fixed wheel of the second gear constant C2. The bearing outer ring of this fourth tapered-roller bearing 90 is supported axially in the direction toward the front on a bearing eye of a clutch bell partition 86 of the transmission housing 95, into which the bearing outer race ring is inserted. The first taperedroller bearing 97 and the fourth tapered-roller bearing 90 thus secure in place axially the two tapered-roller bearings 96 and 85 located between them.

Axially in front of said four bearings, a needle bearing 84 is arranged radially between the two intermediate shafts 12, 14. This needle bearing 84 forms with the third tapered-roller bearing 85 a secure two-point bearing arrangement of the intermediate shaft 12 in relation to the intermediate shaft 14. The two rolling bearings 84, 85 are thus arranged in an annular interspace 82 between the two intermediate shafts 12, 14. This interspace 82 is sealed by means of a rotary shaft lip seal 79 in the direction toward the front, so that transmission oil, which cools and lubricates the tooth engagement inside the double clutch gear during driving operation, cannot enter the clutch space of the two clutches K1, K2. The clutch space is separated from the fixed wheels and loose wheels of the double clutch gear by means of said clutch bell partition 86, so that gear oil cannot enter the clutch space from there either. For this, a further rotary shaft lip seal 87 is inserted into the clutch bell partition 86. The two clutches K1, K2 are dry clutches 7 Between the needle bearing 84 and the third tapered roller bearing 85, the radially inner intermediate shaft 12 comprises a transverse bore 83 which conducts transmission oil from a central lubricant bore 100 into the interspace 82. From there, a first part flow of the transmission oil cools and lubricates the third tapered-roller bearing 85. A second part flow of the transmission oil is conducted through a transverse bore 88 of the intermediate shaft 14 to the fourth tapered-roller bearing 90 and lubricates and cools it.

The centrifugal force owing to the rotating intermediate shafts 12, 14 then distributes the transmission oil radially outward.

The bearing loads of the rolling bearings are explained below. When the gear constant C1 is in the torque path, the second tapered-roller bearing 96 is acted on essentially with a first radial force which results from a part of the radial component of the toothing pairing, currently transmitting torque, between the countershaft 16 or 18 and the transmission output shaft 20. A further part of the radial component of this toothing pairing is of course supported on the rear, first taperedroller bearing 97 (illustrated in FIG. 1). On the other hand, the third tapered-roller bearing 85 is acted on with a second radial force which corresponds approximately to the sum of the first radial force described above and the corresponding radial force component from the gear constant C1 located in the torque flow. The tapered-roller bearing 90 is acted on approximately with the same high second radial force as the third tapered-roller bearing 85. By virtue of the fact that the diameter of the fourth tapered-roller bearing 90 is larger than the diameter of the third tapered-roller bearing 85 which is in turn larger than the diameter of the second tapered-roller bearing 96, the bearing dimensioning of these three tapered-roller bearings 96, 85, 90 corresponds to the level or duration of the bearing load.

The bearing load situation is similar if the gear constant C2 is located in the torque flow. Here, the fourth tapered-roller bearing 90 carries approximately the sum of the radial force component from the gear constant C2 and the radial force transmitted from the tapered-roller bearing 85/96. In this case, the second and the third tapered-roller bearing 85 and 96 are acted on approximately with the same—smaller—radial force.

A torsion damper can be provided in each of the two clutches of the double clutch. A two-mass flywheel can likewise be provided between the drive engine and the double clutch.

Other rolling bearings can also find application instead of the tapered-roller bearings. Angular-contact ball bearings or inclined cylindrical-roller bearings can also find application, for example.

Depending on transmission design, the rolling bearings in X arrangement can be preloaded from slightly to strongly.

Other seals, such as O rings for example, are also conceivable instead of the lip seal between the lubricant bores of the inner intermediate shaft and the gear output shaft.

Parallel-offset countershafts can also find application instead of the coaxial countershafts shown in the illustrative embodiment of FIG. 1.

The embodiments described are only examples. A combination of the features described for different embodiments is likewise possible. Other, not specifically described features of the device parts belonging to the invention can be inferred from the device part geometries illustrated in the drawing.

What is claimed is:

1. A double clutch transmission with an input shaft (10) and an output shaft (20) and two intermediate shafts (12, 14) arranged in a transmission housing (95) coaxially with the transmission input and output shafts (10, 20) and two clutches (K1, K2), each connected to one of inner and outer intermediate shafts (12, 14), the transmission output shaft (20) being supported by means of a rolling bearing arrangement (97 and 96 or 85 or 90), the rolling bearing arrangement (97 and 96 or 85 or 90) comprising two tapered-roller bearings (97 and 96 or 85 or 90), the inner intermediate shaft (12) being arranged inside the outer intermediate shaft (14) which is a hollow shaft, the rolling bearing arrangement comprising a third rolling bearing (85) and a fourth rolling bearing (90), the rolling bearing arrangement (97 and 96 or 85 or 90) being preloaded and the third rolling bearing (85) and the fourth rolling bearing (90) being in an X arrangement in relation to the rolling bearing (97) which supports the transmission output shaft (20) in the transmission housing (95), the rolling bearing (96) which supports the transmission output shaft (20) in relation to the radially inner intermediate shaft (12) being arranged radially inside, and extending axially into, a gearwheel (48) of the inner intermediate shaft (12) which gearwheel (48) belongs to a first gear constant (C1) and is also connected to the inner intermediate shaft (12) is supported by the third roller bearing (85) within the hollow gearwheel (66) of the outer intermediate shaft (14) which hollow gearwheel (66) belongs to a second gear constant (C2) of the double clutch transmission.

2. The double clutch transmission as claimed in claim 1, wherein the inner intermediate shaft (12) is additionally supported by the hollow intermediate shaft (14) via a floating bearing (needle bearing 84) arranged axially adjacent to the third rolling bearing (85).

3. The double clutch transmission as claimed in claim 2, wherein the floating bearing (needle bearing 84) is arranged in an annular space (interspace 82) which is formed between the two intermediate shafts (12, 14) and to which lubricant is supplied by a lubricant duct (83).

4. The double clutch transmission as claimed in claim 3, wherein the radially inner intermediate shaft (12) comprises a central lubricant bore for supplying the floating bearing (needle bearing 84) with lubricant.

5. The double clutch transmission as claimed in claim 4, wherein said central lubricant bore is aligned with a further lubricant bore arranged centrally inside the transmission output shaft (20).

6. The double clutch transmission as claimed in claim 5, wherein the two lubricant bores are sealed in relation to one another in the transition region by means of a seal.

7. The double clutch gear as claimed in claim 6, wherein a rotary shaft lip seal (79) is arranged axially next to the floating bearing (needle bearing 84) so as to prevent lubricant from reaching the double clutch, the latter being in the form of a dry clutch.

8. The double clutch transmission as claimed in claim 1, wherein the third rolling bearing (85) is arranged radially inside, and in an axial overlap region of, a gearwheel which belongs to a second gear constant (C2) and is also connected to the intermediate shaft (14).

9. The double clutch transmission as claimed in claim 1, wherein the radially inner intermediate shaft (12) carries at its end facing away from the double clutch (K1, K2) a gearwheel (48) of a first gear constant (C1), which gearwheel (48) is smaller than a gearwheel (66) of a second gear constant (C2), which gearwheel (66) is disposed on the hollow intermediate shaft (14).

* * * * *